United States Patent
Kutz et al.

(10) Patent No.: US 11,316,616 B2
(45) Date of Patent: Apr. 26, 2022

(54) CONSTRAINT-BASED CODE BLOCK INTERLEAVER FOR DATA AIDED RECEIVERS

(71) Applicant: QUALCOMM INCORPORATED, San Diego, CA (US)

(72) Inventors: Gideon Shlomo Kutz, Ramat Hasharon (IL); Amit Bar-Or Tillinger, Petach Tikva (IL); Assaf Touboul, Netanya (IL); Shay Landis, Hod Hasharon (IL); Michael Levitsky, Rehovot (IL); Guy Wolf, Rosh Haayin (IL); Ronen Shaked, Kfar Saba (IL)

(73) Assignee: QUALCOMM INCORPORATED, San Diego, CA (US)

( * ) Notice: Subject to any disclaimer, the term of this patent is extended or adjusted under 35 U.S.C. 154(b) by 278 days.

(21) Appl. No.: 16/797,693

(22) Filed: Feb. 21, 2020

(65) Prior Publication Data
US 2021/0266101 A1    Aug. 26, 2021

(51) Int. Cl.
*H04W 72/04* (2009.01)
*H04L 5/00* (2006.01)
*H04L 1/00* (2006.01)

(52) U.S. Cl.
CPC .......... *H04L 1/0071* (2013.01); *H04L 1/0003* (2013.01); *H04L 5/0044* (2013.01);
(Continued)

(58) Field of Classification Search
None
See application file for complete search history.

(56) References Cited

U.S. PATENT DOCUMENTS

| 8,509,051 | B2 | 8/2013 | Ling et al. |
| 8,908,632 | B2 * | 12/2014 | Pi .......................... H04L 5/0016 370/330 |

(Continued)

FOREIGN PATENT DOCUMENTS

WO    2009003064    12/2008

OTHER PUBLICATIONS

Ericsson: "Code Block Segmentation", 3GPP Draft, 3GPP TSG RAN WG1 Meeting #89, R1-1707065 Code Block Segmentation, 3rd Generation Partnership Project (3GPP), Mobile Competence Centre, 650, Route Des Lucioles, F-06921 Sophia-Antipolis Cedex, France, vol. RAN WG1, No. Hangzhou, May 15, 2017-May 19, 2017 May 14, 2017 (May 14, 2017), XP051272294, pp. 1-4, Retrieved from the Internet URL:http://www.3gpp.org/ftp/Meetings_ 3GPP_SYNC/RAN1/Docs/ [retrieved on May 14, 2017]Sections 2 and 3.

(Continued)

*Primary Examiner* — Duc T Duong
(74) *Attorney, Agent, or Firm* — Haynes and Boone, LLP

(57) ABSTRACT

Methods related to wireless communication systems and the transmission of code blocks on such systems are provided. A wireless communication device interleaves a plurality of code block segments in time and frequency. The segments are interleaved by mapping a first code block segment of the plurality of code block segments to a first resource located at a first time and a first frequency, wherein the first code block segment is associated with a first code block, and mapping a second code block segment of the plurality of code block segments to a second resource based on at least one of the first time or the first frequency of the first resource and a code block proximity parameter, wherein the second code block segment is associated with a second code block different from the first code block. The device then transmits (Continued)

the plurality of interleaved code block segments. Other features are also claimed and described.

30 Claims, 10 Drawing Sheets

(52) U.S. Cl.
CPC ......... *H04L 5/0051* (2013.01); *H04W 72/042* (2013.01); *H04W 72/0446* (2013.01); *H04W 72/0453* (2013.01)

(56) References Cited

U.S. PATENT DOCUMENTS

| | | | |
|---|---|---|---|
| 9,444,591 B2 | 9/2016 | Pi et al. | |
| 9,544,033 B2 | 1/2017 | Kim et al. | |
| 2005/0058089 A1* | 3/2005 | Vijayan | H04L 5/0007 370/312 |
| 2008/0316977 A1* | 12/2008 | Malladi | H04L 1/0041 370/335 |
| 2010/0215007 A1* | 8/2010 | Zhang | H04L 1/0071 370/329 |
| 2014/0153484 A1* | 6/2014 | Kim | H04L 27/34 370/328 |
| 2015/0131516 A1 | 5/2015 | Zhang | |
| 2016/0173130 A1* | 6/2016 | Krysl | H04L 1/0057 714/776 |
| 2018/0034596 A1* | 2/2018 | Noh | H04L 1/1812 |
| 2018/0083736 A1* | 3/2018 | Manolakos | H03M 13/2707 |
| 2018/0167829 A1* | 6/2018 | Luo | H04L 1/0071 |
| 2018/0367202 A1 | 12/2018 | Yang et al. | |
| 2019/0028229 A1* | 1/2019 | Yeo | H04L 1/0058 |
| 2019/0098608 A1* | 3/2019 | Yi | H04L 5/0037 |
| 2019/0190654 A1* | 6/2019 | You | H04L 1/0065 |
| 2019/0327024 A1* | 10/2019 | Lee | H04L 27/2604 |
| 2020/0059341 A1* | 2/2020 | Zhang | H04L 5/0007 |
| 2020/0177308 A1* | 6/2020 | Lee | H04L 1/0011 |
| 2020/0235759 A1* | 7/2020 | Ye | H03M 13/116 |
| 2020/0274661 A1* | 8/2020 | Yoshioka | H04W 72/1284 |
| 2021/0120537 A1* | 4/2021 | Lei | H04L 5/0053 |
| 2021/0136695 A1* | 5/2021 | Liu | H04W 76/27 |

OTHER PUBLICATIONS

International Search Report and Written Opinion—PCT/US2021/018372—ISA/EPO—dated May 28, 2021.

* cited by examiner

CONSTRAINT-BASED CODE BLOCK INTERLEAVER FOR DATA AIDED RECEIVERS

TECHNICAL FIELD

The technology described below relates generally to wireless communication systems, and more particularly to code block transmissions in wireless communication systems. Certain embodiments can enable and provide techniques allowing a communication device (e.g., user equipment devices or base stations) to transmit code blocks with time diversity and frequency diversity while assisting a reencoding receiving device in data-aided channel estimation and reception.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices (e.g., user equipment (UE)).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. As use cases and diverse deployment scenarios continue to expand in wireless communication, coding technique improvements may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Some aspects of the present disclosure enable and provide mechanisms and techniques enabling improved communication and operational performance. Such improvements may be brought about via disclosed aspects, embodiments, and techniques providing time diversity and/or frequency diversity in code block transmissions. Aspects can provide assistance to and enable a reencoding receiver for data-aided channel estimation and reception. A reencoding receiver may refer to a receiver that reencodes data decoded from a signal received from a transmitter using the same encoding and modulation process as the transmitter. The reencoding receiver may utilize the reencoded signal as a reference signal for channel estimation in subsequent data decoding. For example, a transmitter may map code blocks to time and/or frequency resources by interleaving code block segments (e.g., based on a code block proximity parameter). Further in some aspects, a transmitter can distribute code block segments within a code block across time and frequency within an allocated resource for time diversity and/or frequency diversity. A code block proximity parameter may constrain placements (e.g., positions) of code block segments in various ways to facilitate reencoding at a respective receiver for channel estimation. The code block proximity parameter may include a time and/or frequency offset that constrains the placement of code block segments from adjacent code blocks. For example, the code block proximity parameter may indicate that the code block segments should be placed no more than one symbol period apart and/or no more than three subcarriers apart.

In an aspect of the disclosure, a method of wireless communication includes interleaving, by a first wireless communication device, a plurality of code block segments in time and frequency. The interleaving may include mapping a first code block segment of the plurality of code block segments to a first resource located at a first time and a first frequency. The first code block segment is associated with a first code block. The method may also include mapping a second code block segment of the plurality of code block segments to a second resource based on at least one of the first time or the first frequency of the first resource and a code block proximity parameter. The second code block segment is associated with a second code block different from the first code block. The method may also include transmitting, by the first wireless communication device, the plurality of interleaved code block segments.

In an additional aspect of the disclosure, a method of wireless communication includes receiving, by a first wireless communication device, a plurality of code block segments interleaved in time and frequency. The method may also include decoding, by the first wireless communication device, the plurality of code block segments. Decoding the plurality of code block segments may include decoding a first subset of the plurality of code block segments from first resources at a first time and a first frequency. The first subset of the plurality of code block segments is associated with a first code block. Decoding the plurality of code block segments may also include decoding a second subset of the plurality of code block segments from second resources based on the first time and the first frequency of the first resources and a code block proximity parameter. The second subset of the plurality of code block segments is associated with a second code block.

In an additional aspect of the disclosure, an apparatus includes a processor configured to interleave a plurality of code block segments in time and frequency. The processor is configured to perform the interleaving by mapping a first code block segment of the plurality of code block segments to a first resource located at a first time and a first frequency. The first code block segment is associated with a first code block. The processor is also configured to perform the interleaving by mapping a second code block segment of the plurality of code block segments to a second resource based on at least one of the first time or the first frequency of the first resource and a code block proximity parameter. The second code block segment is associated with a second code block different from the first code block. The apparatus may also include a transceiver configured to transmit the plurality of interleaved code block segments.

In an additional aspect of the disclosure, an apparatus comprises a transceiver configured to receive a plurality of code block segments interleaved in time and frequency and a processor configured to decode the plurality of code block segments. The processor is configured to decode the plurality of code block segments by decoding a first subset of the plurality of code block segments from first resources at a first time and a first frequency. The first subset of the plurality of code block segments is associated with a first code block. The processor is also configured to decode the plurality of code block segments by decoding a second subset of the plurality of code block segments from second resources based on the first time and the first frequency of the first resources and a code block proximity parameter. The second subset of the plurality of code block segments is associated with a second code block.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
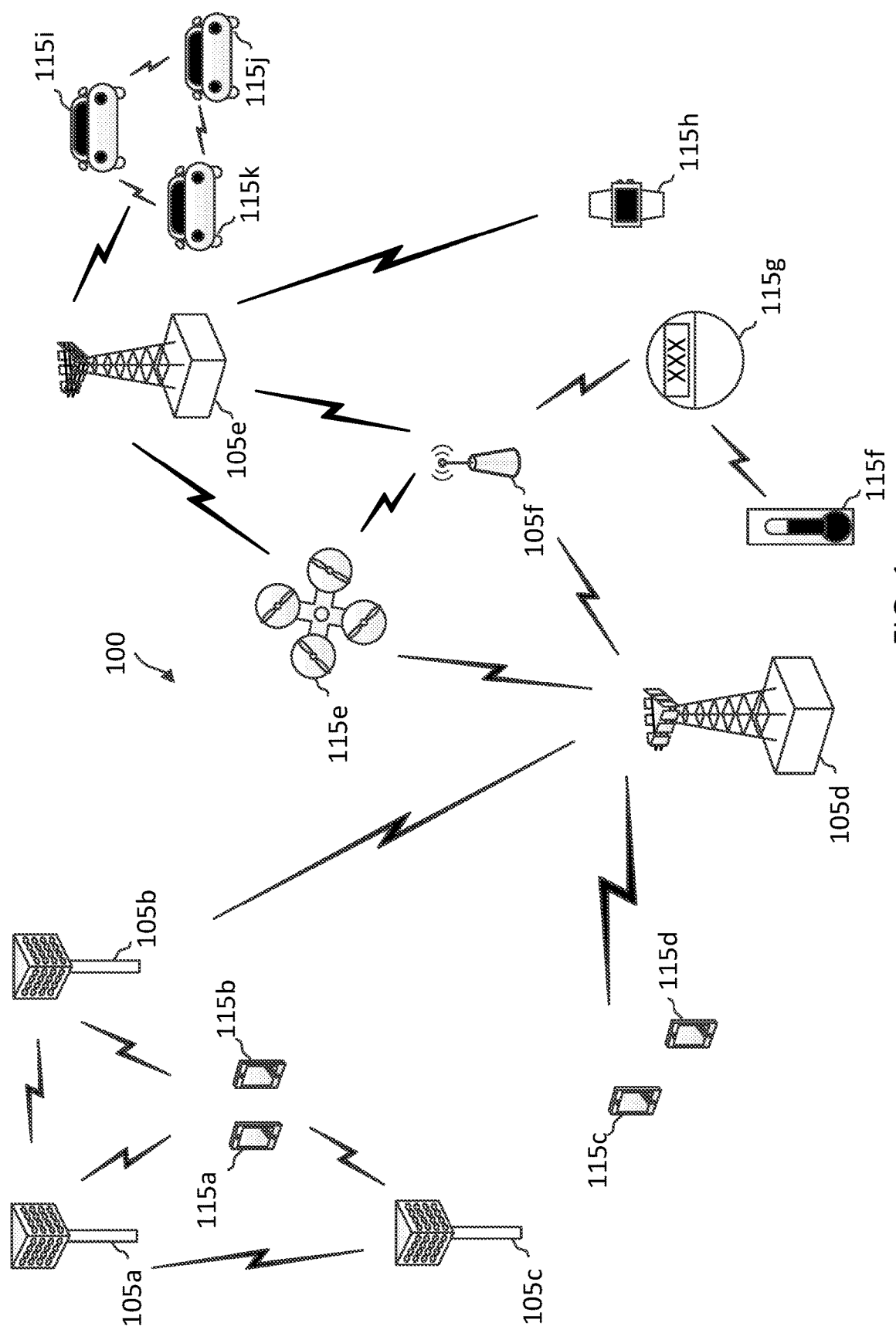
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In order to decode incoming signals, a receiver may account for signal distortion and other adverse effects, such as signal attenuation, delays, and phase-shifts, during propagation from a transmitter, which can be accomplished through channel estimation. Channel estimation can be performed using pilots or reference signals, which include predetermined values (e.g., modulation symbols) known to both a transmitter and receiver. For instance, a transmitter may insert pilots into a data stream for transmission over a channel to a receiver. The predetermined values or the modulation symbols may be referred to as pilots. When a receiver receives a pilot signal, it may compare the value received in the signal to the value it expected to determine an estimate of the channel. The channel estimate can then be applied to demodulate the received signal for data decoding.

The number of pilots required to maintain an acceptable quality of service may vary with the characteristics of the channel used for communication. For example, a device undergoing rapid changes in position, like a user equipment (UE) inside a moving vehicle, may require a greater number of pilots to perform accurate channel estimation than would a stationary UE. To enable channel estimation for data signals, pilots are typically interspersed in frequency and/or time with data signals and require resources that would otherwise be used to transmit data. As a result, increasing the number of pilots that are transmitted over a period of time increases the accuracy of the channel estimation process, but reduces the amount of data that can be transmitted over the same period. Conversely, reducing the number of pilots transmitted over a period of time decreases the accuracy of the channel estimation process, but increases the amount of data that can be transmitted over the same period.

One way to reduce pilots for accurate channel estimation is to use a reencoding receiver. A reencoding receiver may refer to a receiver that reencodes data decoded from a signal received from a transmitter using the same encoding and modulation process as the transmitter. The reencoding can recreate or reconstruct a signal that may represent an original transmitted signal (e.g., without any channel distortions or channel effects). A recreated or reconstructed signal can function as a pilot signal or a reference signal for channel estimation when decoding a subsequent data signal. For instance, a receiver can determine a channel estimate for a channel between a transmitter and a receiver by comparing a received signal with a reconstructed signal. The channel estimate can be used for demodulating and decoding a subsequent second signal received from the transmitter. This can be repeated for a subsequent third received signal, where a channel estimate for demodulating and decoding data from third received signal may be determined based on reencoding data decoded from the second received signal, and so on. This technique can reduce or eliminate the need for pilots for the remainder of the transmission. The use of reencoded data decoded from a received signal for subsequent data decoding may be referred to as data-aided channel estimation and reception.

According to some wireless communication systems, a communication device may transmit data packets in the form of transport blocks. A transport block may be partitioned into smaller blocks, which may be referred to as code blocks, before encoding, modulation, and resource mapping are applied to generate a physical data signal for transmission. For instance, each code block may be encoded into encoded bits based on a certain coding scheme (e.g., convolutional encoding, low-density parity check (LDPC), polar encoding) and/or a certain coding rate. The encoded bits can be modulated based on a certain modulation scheme (e.g., quadrature phase-shift-keying (QPSK), 16-quadrature-amplitude-modulation (16QAM), 64-quadrature-amplitude-modulation (64QAM), or 256QAM) into modulation symbols. The modulation symbols may be mapped to a certain time-frequency resource block based on a resource allocation. One way to map the modulation symbols representing the code blocks to the resources is to utilize a frequency-first mapping scheme. For instance, a resource block may include a plurality of symbols in time, where each symbol may include a plurality of subcarriers in frequency. A frequency-first mapping first maps the modulation symbols to subcarriers within a current symbol and may continue to a next symbol when all subcarriers are mapped in the current symbol. In other words, the code blocks are mapped sequentially across frequency and then across time. For instance, a first code block may be mapped to the first two symbols of the resource block, and a second code block may be mapped to the next two symbols of the resource block. As such, the frequency-first mapping may provide each code block transmission with frequency diversity but not time diversity, and thus may not achieve a good performance.

One way to improve performance is to utilize a time-frequency interleaver to gain time diversity and frequency diversity. For instance, each code block may be further segmented into multiple code block segments and the code block segments may be distributed near-evenly across time and frequency in the resource block during resource mapping. When code block segments are distributed across time and frequency, code lock segments of a current code block can be far away from code block segments of a previous block in time and/or frequency. Thus, such an approach may be problematic for a reencoding receiver because a current code block may rely on a channel estimate determined from a previous code block (e.g., reencoding data decoded from the previous code block). When the channel changes rapidly in time and/or frequency, there is no guarantee that the channel estimated from the previous code block is representative of the channel when the current code block is transmitted.

Various mechanisms and techniques for providing time diversity and/or frequency diversity in code block transmissions are discussed herein. Some aspects enable multi-dimension diversity (e.g., time/frequency) while providing assistance to a reencoding receiver for data-aided channel estimation and reception. For example, a transmitter may map code blocks to time and/or frequency resources by interleaving code block segments. In some aspects, interleaving can be based on a code block proximity parameter. Additionally or alternatively, a communication device (e.g., a transmitter) can interleave by distributing code block segments within a code block across time and frequency (e.g., within an allocated resource for time diversity and frequency diversity).

A code block proximity parameter may constrain the placement (e.g., positions) of code block segments in various ways. Such an approach can facilitate reencoding at a respective receiver for channel estimation. For example, a placement constrained by the code block proximity parameter may ensure that code block segments of a current code block are in close proximity (e.g., in time and/or frequency) to code block segments of a previous code block. For example, the code block proximity parameter may include a time offset (e.g., a time threshold) and/or a frequency offset (e.g., a frequency threshold).

Offsets in time and/or frequency may be utilized for a variety of purposes. For example, a time offset may indicate how many units of time, e.g., symbols, a code block segment may be placed offset from a different code block segment, or provide a minimum, maximum, or range of time units offset from a different code block segment. A frequency offset may indicate how far apart in a frequency band, for example, in subcarriers, a code block segment may be placed offset from a different code block segment, or the minimum or maximum such distance, or a range of acceptable distances. After interleaving, mapping, and/or placement of code block segments, interleaved code block segments may be transmitted using the time and frequency resources allocated to them (e.g., taking into account any offsets of interest).

Proximity parameters associated with code blocks may relate to offsets in some deployments. For example, in some aspects, the code block proximity parameter may include a frequency offset less than three subcarriers. In some aspects, the code block proximity parameter may include a time offset less than three symbol periods, or one symbol period. In some aspects, the code block proximity parameter may indicate frequency and/or time offsets between code block segments of adjacent code blocks in a sequence, or may indicate that two code block segments from different code blocks are to be placed adjacent to each other in time and/or frequency.

In some aspects, the code block segments may be transmitted using a physical downlink shared channel (PDSCH) signal which does not include a reference signal (e.g., pilot symbols).

A receiver receiving the code block segments may decode them by decoding a first subset of the code block segments associated with a first code block, then decoding a second subset of code block segments based on the time and/or frequency locations of the code blocks in the first subset and a code block proximity parameter.

In some aspects, the receiver may reencode the decoded first subset of the code block segments to generate a reference signal, then decode the second subset of code blocks based on the reference signal.

Aspects of the present disclosure can provide several benefits. For example, a reencoding receiver may rely on having the code block whose data is being used for channel estimation in close proximity to the code block using its data for channel estimation, and a traditional time-frequency interleaver may not provide the required co-location of code blocks. Some constraint-based interleaving methods of this disclosure, however, can map code blocks across resources in time and frequency—achieving a high degree of time/frequency diversity—while placing adjacent code blocks near each other. These approaches may result in increased performance over other code block mapping methods. Placing adjacent code blocks near each other in a data transmission can support a reencoding receiver to perform data-aided channel estimation and reception. This can help to reduce the number of pilots to be included in the data transmission or eliminating pilots from the data transmission, and thus may improve spectral efficiency.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 may be dispersed throughout the wireless network 100, and each UE 115 may be stationary or mobile. UEs can take in a variety of forms and a range of form factors. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. The random access procedure (or RACH procedure) may be a single or multiple step process. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. Scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, BSs 105 may transmit data signals to UEs 115 including sequences of code blocks. The BSs 105 may generate the data signals using a constraint-based time-frequency code block interleaver. For instance, the BS 105 may transmit data in the form of transport blocks. The BS 105 may partition a transport block into code blocks, encode the code blocks, and further partition the encoded code blocks into code block segments. The BS 105 may interleave the code block segments in frequency and time. Each code block may be positioned in proximity to a previous code block, for example, to assist the UE 115 in performing data-aided channel estimation and reception. For instance, the BS 105 may map or place code block segments of a code block in an allocated resource based on the location of code block segments of a previous code block sand a code block proximity parameter, and then transmit the interleaved code block segments to the UE 115, for example, via a PDSCH.

Upon receiving one or more code block segments, a UE 115 may decode the code block segments of a code block. Decoding can be based on the location of a previous code block and a code block proximity parameter. In some instances, the UE 115 may also employ a reencoding receiver scheme to reconstruct a reference signal by reencoding and remodulating a code block recovered from a received data signal and utilize the reconstructed reference signal (e.g., an undistorted signal as transmitted at the BS 105) for channel estimation and decoding for a next code block in the received data signal. In other words, the UE 115 may determine a channel estimate for each subsequent code block based on a previously decoded code block without having to rely pilots being transmitted along with the code blocks. As such, a BS 105 may reduce the number of pilots in a data transmission or eliminate pilots from the remaining data transmission. Mechanisms for performing constraint-based time-frequency interleaving/deinterleaving with support for data-aided channel estimation and reception are described in greater detail herein.

Figure 2:
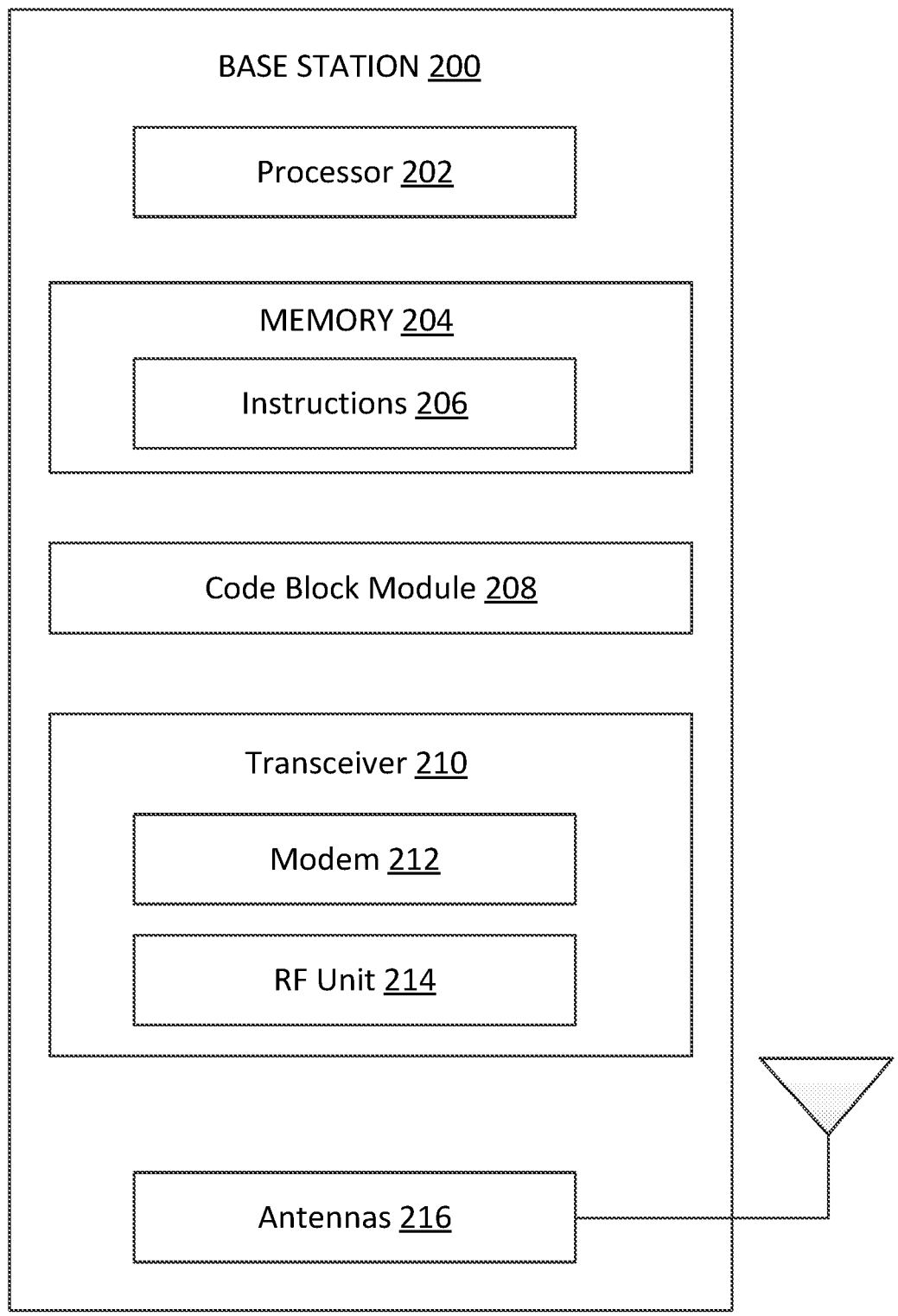
FIG. 2 is a block diagram of an exemplary base station (BS) according to some aspects of the present disclosure.

FIG. 2 is a block diagram of an exemplary BS 200 according to some aspects of the present disclosure. The BS 200 may be a BS 105 in the network 100 as discussed above in FIG. 1. As shown, the BS 200 may include a processor 202, a memory 204, a code block module 208, a transceiver 210 including a modem subsystem 212 and a RF unit 214, and one or more antennas 216. These elements may be in direct or indirect communication with each other, for example via one or more buses.

The processor 202 may have various features as a specific-type processor. For example, these may include a CPU, a DSP, an ASIC, a controller, a FPGA device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 204 may include a non-transitory computer-readable medium. The memory 204 may store instructions 206. The instructions 206 may include instructions that, when executed by the processor 202, cause the processor 202 to perform operations described herein, for example, aspects of FIGS. 4-9. Instructions 206 may also be referred to as program code. The program code may be for causing a wireless communication device to perform these operations, for example by causing one or more processors (such as processor 202) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The code block module 208 may be implemented via hardware, software, or combinations thereof. For example, the code block module 208 may be implemented as a processor, circuit, and/or instructions 206 stored in the memory 204 and executed by the processor 202. In some examples, the code block module 208 can be integrated within the modem subsystem 212. For example, the code block module 208 can be implemented by a combination of software components (e.g., executed by a DSP or a general processor) and hardware components (e.g., logic gates and circuitry) within the modem subsystem 212.

The code block module 208 may be used for various aspects of the present disclosure, for example, aspects of FIGS. 4-9. The code block module 208 is configured to prepare DL data for transmission, for example, to a UE 115. The DL data may be in the form of a transport block. The code block module 208 is configured to partition the transport block into a number of code blocks, encode the code blocks, partition the encoded code blocks into code block segments. The encoding process may include encoding a code block using a certain coding scheme (e.g., convolutional code, LDPC, or polar code), performing rate-matching based on a certain code rate and generating modulation symbols from the encoded, rate-matched code block based on a certain modulation scheme (e.g., QPSK, 16QAM, 64QAM, 256QAM), or other encoding or modulation techniques.

The code block module 208 may also be configured to allocate time and/or frequency resources (e.g., one or more RBs) for data transmission and map the encoded code block segments into the time and/or frequency resources. For instance, the code block module 208 is further configured to map the code blocks segments by interleaving code block segments based on a code block proximity parameter and the locations of code block segments associated with different code blocks. The code block proximity parameter may constrain the placement of code block segments in various ways. For example, the code block proximity parameter may include time and/or frequency offsets. A time offset may indicate how many units of time, e.g., symbols, a code block segment may be placed from a different code block segment, or provide a minimum, maximum, or range of time units away from a different code block segment. Similarly, a frequency offset may indicate how far apart in a frequency band, for example, in subcarriers, a code block segment may be placed from a different code block segment, or the minimum or maximum such distance, or a range of acceptable distances.

The code block module 208 is further configured to transmit the interleaved code block segments using the allocated time and frequency resources, via the transceiver 210. For instance, the code block module 208 is configured to generate a DL communication signal including a PDCCH signal and a PDSCH signal. The PDSCH signal may include the interleaved code block segments. The PDCCH signal may include DL control information (e.g., resource allocation information and coding/modulation parameters) associated with the transmission of the PDSCH signal. In some instances, the code block module 208 may include pilot symbols in the PDCCH signal, but may not include pilot symbols in the PDSCH signal. For instance, the code block module 208 may transmit the DL communication signal to a UE 115 configured with a reencoding receiver that performs data-aided channel estimation and reception. In some instances, when pilot symbols are included the PDDCH signal, they may serve as a reference for phase tracking during channel estimation for the PDSCH signal. For instance, depending on the placement or interleaving of the code block segments in the PDSCH, some code block segments placed in a symbol that is distant from a previous code block may be at a close proximity to the PDCCH signal (e.g., in a symbol adjacent to the PDCCH signal), and thus the PDCCH can serve as a reference for channel estimation and decoding of such code block segments. In some other instances, the pilot symbols in the PDCCH signal may not be used at a receiver for PDSCH channel estimation, for example, when the PDCCH signal and the PDSCH signal are transmitted in different beam directions.

In some aspects, the code block module 208 can be configured to handle proximity parameter operations. For example, the code block module can also be configured to determine the code block proximity parameter, transmit a configuration of the code block proximity parameter to the UE 115, for example, to facilitate data decoding at the UE 115. The code block module 208 may transmit the code block proximity parameter in a DL scheduling grant, a UL scheduling, and/or in an RRC configuration. Mechanisms for constraint-based code block time-frequency interleaving are described in greater detail herein.

As shown, the transceiver 210 may include the modem subsystem 212 and the RF unit 214. The transceiver 210 can be configured to communicate bi-directionally with other devices, such as the UEs 115 and/or 300 and/or another core network element. The modem subsystem 212 may be configured to modulate and/or encode data according to a MCS, e.g., a LDPC coding scheme, a turbo coding scheme, a convolutional coding scheme, a digital beamforming scheme, etc. The RF unit 214 may be configured to process (e.g., perform analog to digital conversion or digital to analog conversion, etc.) modulated/encoded data (e.g., PDSCH signal, PDCCH signal, DL data, scheduling grants, RRC configurations) from the modem subsystem 212 (on outbound transmissions) or of transmissions originating from another source such as a UE 115 and/or UE 300. The RF unit 214 may be further configured to perform analog beamforming in conjunction with the digital beamforming. Although shown as integrated together in transceiver 210, the modem subsystem 212 and/or the RF unit 214 may be separate devices that are coupled together at the BS 105 to enable the BS 105 to communicate with other devices.

The RF unit 214 may provide modulated and/or processed data, e.g. data packets (or, more generally, data messages that may contain one or more data packets and other information), to the antennas 216 for transmission to one or more other devices. This may include, for example, transmission of information to complete attachment to a network and communication with a camped UE 115 or 300 according to some aspects of the present disclosure. The antennas 216 may further receive data messages transmitted from other devices and provide the received data messages for processing and/or demodulation at the transceiver 210. The transceiver 210 may provide the demodulated and decoded data (e.g., PUSCH signal, UL data) to the code block module 208 and configured transmission module 208 for processing. The antennas 216 may include multiple antennas of similar or different designs to sustain multiple transmission links.

In an example, the code block module 208 is configured to interleave a plurality of code block segments in time and frequency. Interleaving can include mapping a first code block segment of the plurality of code block segments to a first resource located at a first time and a first frequency. A first code block segment can be associated with a first code block. The code block module 208 is also configured to map a second code block segment of the plurality of code block segments to a second resource based on at least one of the first time or the first frequency of the first resource and a code block proximity parameter. A second code block segment can be associated with a second code block different from the first code block. The transceiver 210 is configured to transmit the plurality of interleaved code block segments.

In an aspect, the BS 200 can include multiple transceivers 210 implementing different RATs (e.g., NR and LTE). In an aspect, the BS 200 can include a single transceiver 210 implementing multiple RATs (e.g., NR and LTE). In an aspect, the transceiver 210 can include various components, where different combinations of components can implement different RATs.

Figure 3:
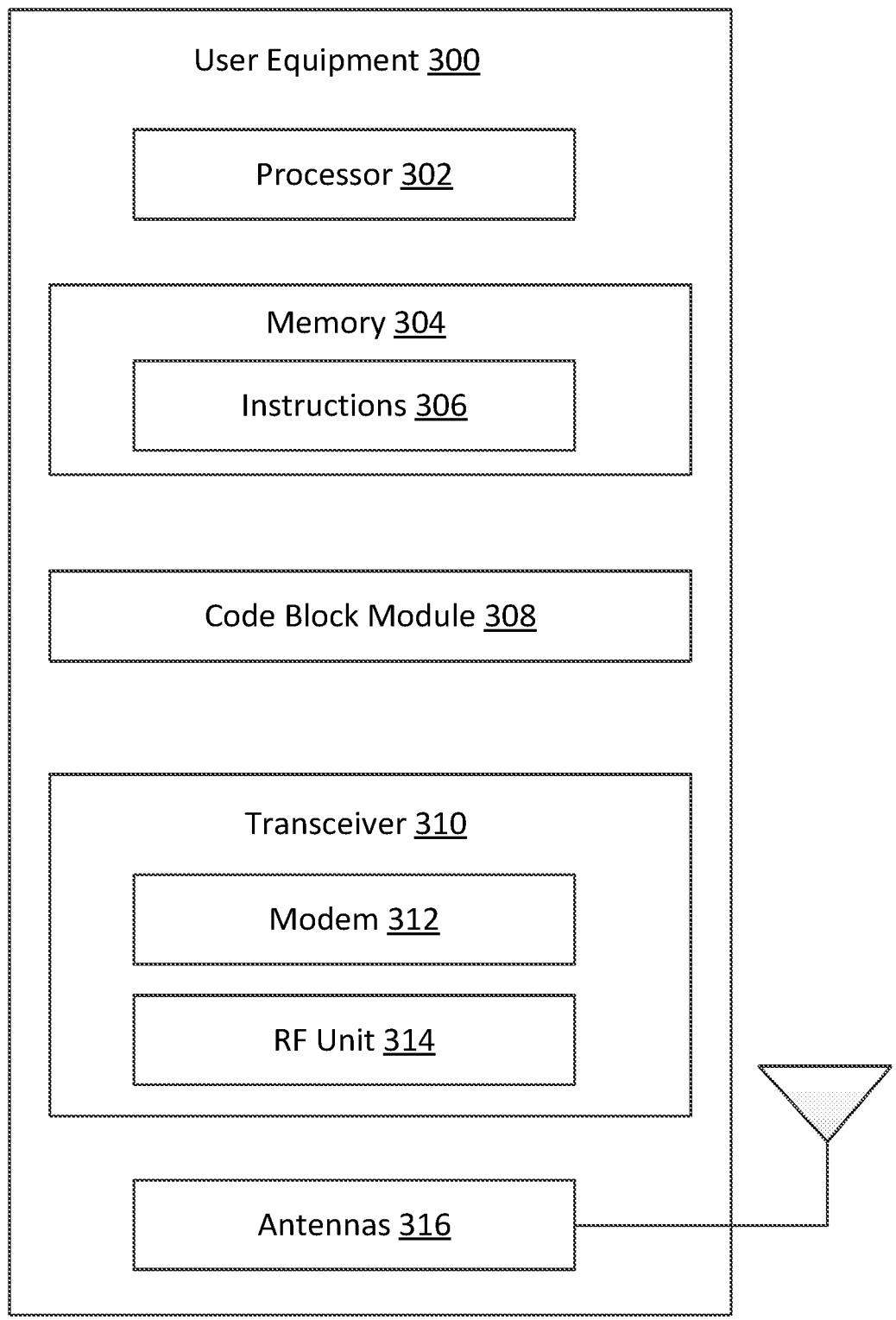
FIG. 3 is a block diagram of an exemplary user equipment (UE) according to some aspects of the present disclosure.

FIG. 3 is a block diagram of an exemplary UE 300 according to some aspects of the present disclosure. The UE 300 may be a UE 115 discussed above in FIG. 1. As shown, the UE 300 may include a processor 302, a memory 304, a code block module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with aspects of the present disclosure, for example, aspects of FIGS. 4-9. Instructions 306 may also be referred to as program code, which may be interpreted broadly to include any type of computer-readable statement(s) as discussed above with respect to FIG. 2.

The code block module 308 may be implemented via hardware, software, or combinations thereof. For example the code block module 308 may be implemented as a processor, circuit, and/or instructions 306 stored in the memory 304 and executed by the processor 302. In some examples, the code block module 308 can be integrated within the modem subsystem 312. For example, the code block module 308 can be implemented by a combination of software components (e.g., executed by a DSP or a general processor) and hardware components (e.g., logic gates and circuitry) within the modem subsystem 312.

The code block module 308 may be used for various aspects of the present disclosure, for example, aspects of FIGS. 4-9. The code block module 308 is configured to receive a data signal, for example, from a BS 105 or a BS 200. The data signal may include a plurality code block segments interleaved in time and frequency. The plurality of code block segments are associated with a plurality code blocks. The code block module 308 is configured to decode the plurality of code block segments by decoding a first subset of the plurality of code block segments from first resources at a first time and a first frequency. A first subset of the plurality of code block segments can be associated with a first code block. The code block module 308 is also configured to decode a second subset of the plurality of code block segments from second resources based on the first time and the first frequency of the first resources and a code block proximity parameter. A second subset of the plurality of code block segments can be associated with a second code block.

In some aspects, the code block module 308 is also configured to perform reencoding for data-aided channel estimation and reception. For instance, the code block module 308 is configured to reencode the first subset of code block segments decoded from the received signal using the same encoding and modulation process as the BS 105 or 200 to reconstruct a reference signal, determine a channel estimate based on the reconstructed reference signal, and decode the second subset of code block segments based on the channel estimate.

In some aspects, the code block module 308 is configured to receive a code block proximity parameter for decoding in an RRC configuration and/or a scheduling grant. Mechanisms for performing decoding based on a code block proximity parameter and data-aided channel estimation and reception are described in greater detail herein.

As shown, the transceiver 310 may include a modem subsystem 312 and an RF unit 314. The transceiver 310 can be configured to communicate bi-directionally with other devices, such as the BSs 105. The modem subsystem 312 may be configured to modulate and/or encode the data from the memory 304 and/or the configured transmission module 507 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data (e.g., PUSCH signal, UL data) from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The transceiver 310 may provide the demodulated and decoded data (e.g., PDSCH signal, PDCCH, DL data, scheduling grants, RRC configuration) to the configured transmission module 507 for processing. The antennas 316 may include multiple antennas of similar or different designs in order to sustain multiple transmission links. The RF unit 314 may configure the antennas 316.

In an aspect, the UE 300 can include multiple transceivers 310 implementing different RATs (e.g., NR and LTE). In an aspect, the UE 300 can include a single transceiver 310 implementing multiple RATs (e.g., NR and LTE). In an aspect, the transceiver 310 can include various components, where different combinations of components can implement different RATs.

For simplicity, the BS 200 is illustrated as having a code block module 208 (for code block generation and transmission) and the UE 300 is illustrated as having a code block module 308 (for code block reception and decoding). Yet in practice, a BS may also have a code block module similar to the code block module 308 (for code block reception and decoding) and a UE may also have a code block module similar to the code block module 208 (for code block generation and transmission). Modules may be implemented via one or more circuits, software, or a combination thereof.

Figure 4:
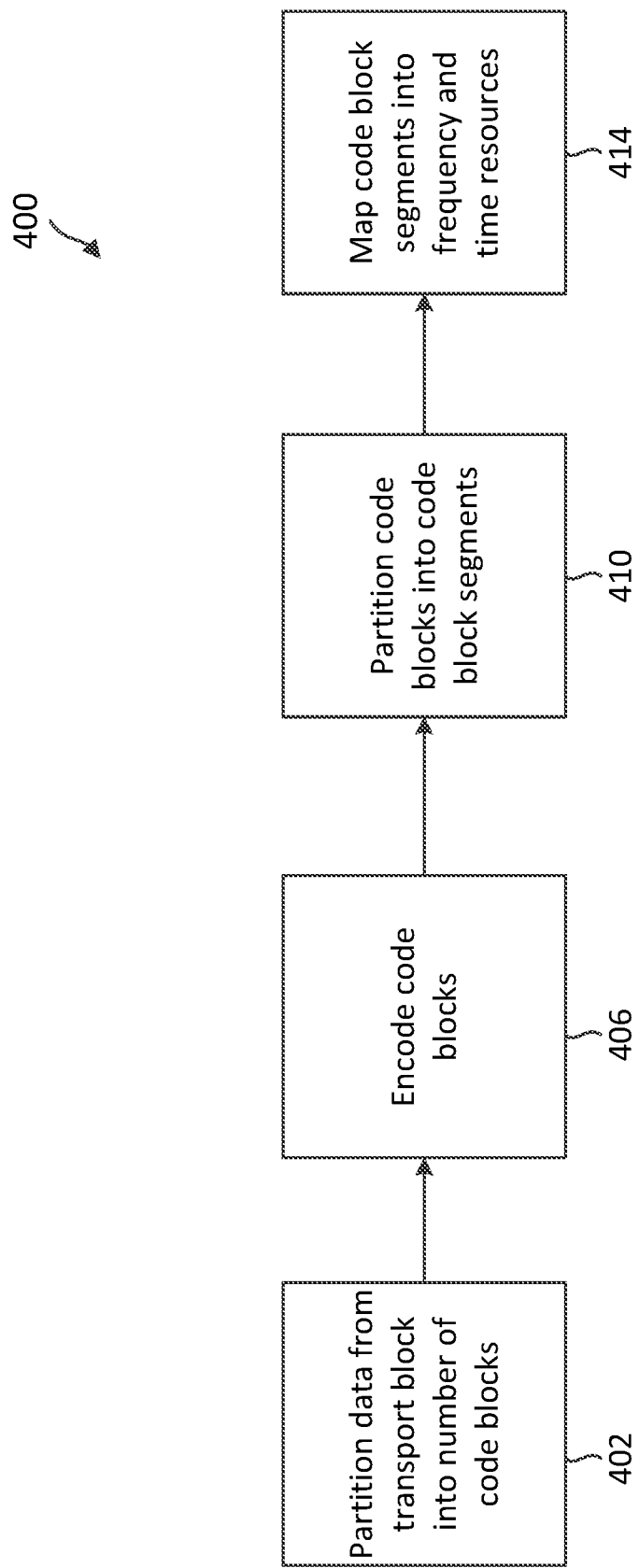
FIG. 4 is a sequence diagram illustrating code block mapping method according to some aspects of the present disclosure.

FIG. 4 illustrates a code block mapping method 400 according to some aspects of the present disclosure. The method 400 may be performed by a wireless communication device such as a BS 105 or a UE 115 using, for example, the code block module 208 of FIG. 2. In particular, a transmitting device, which may be a BS 105 or a UE 115, may perform code block mapping during a data transmission as shown in the method 400.

At block 402, a transmitting device can partition data from a transport block into a number of code blocks. The data may be received from an upper layer (e.g., a medium access control (MAC) layer). The number of code blocks may be dependent on the size of the transport block (e.g., number of bytes), the encoding scheme to be used for encoding, and various other factors.

At block 404, a transmitting device encodes code blocks. Encoding may occur according to a certain data encoding scheme (e.g., a convolutional code, an LDPC code, or a polar code) and/or a certain coding rate (e.g., 1/2, 1/3, 2/3). The encoding may also include modulating the encoded data bits in the code block into modulation symbols according to a certain modulation scheme (e.g., QPSK, 16QM, 64QAM, or 256QAM).

At block 406, a transmitting device partitions code blocks. Each code block can be partitioned into code block segments (e.g., about 2, 3, or more).

At block 410, a transmitting device can map code block segments. Mapping can map segments into frequency and time resources in preparation for transmission.

Figure 5:
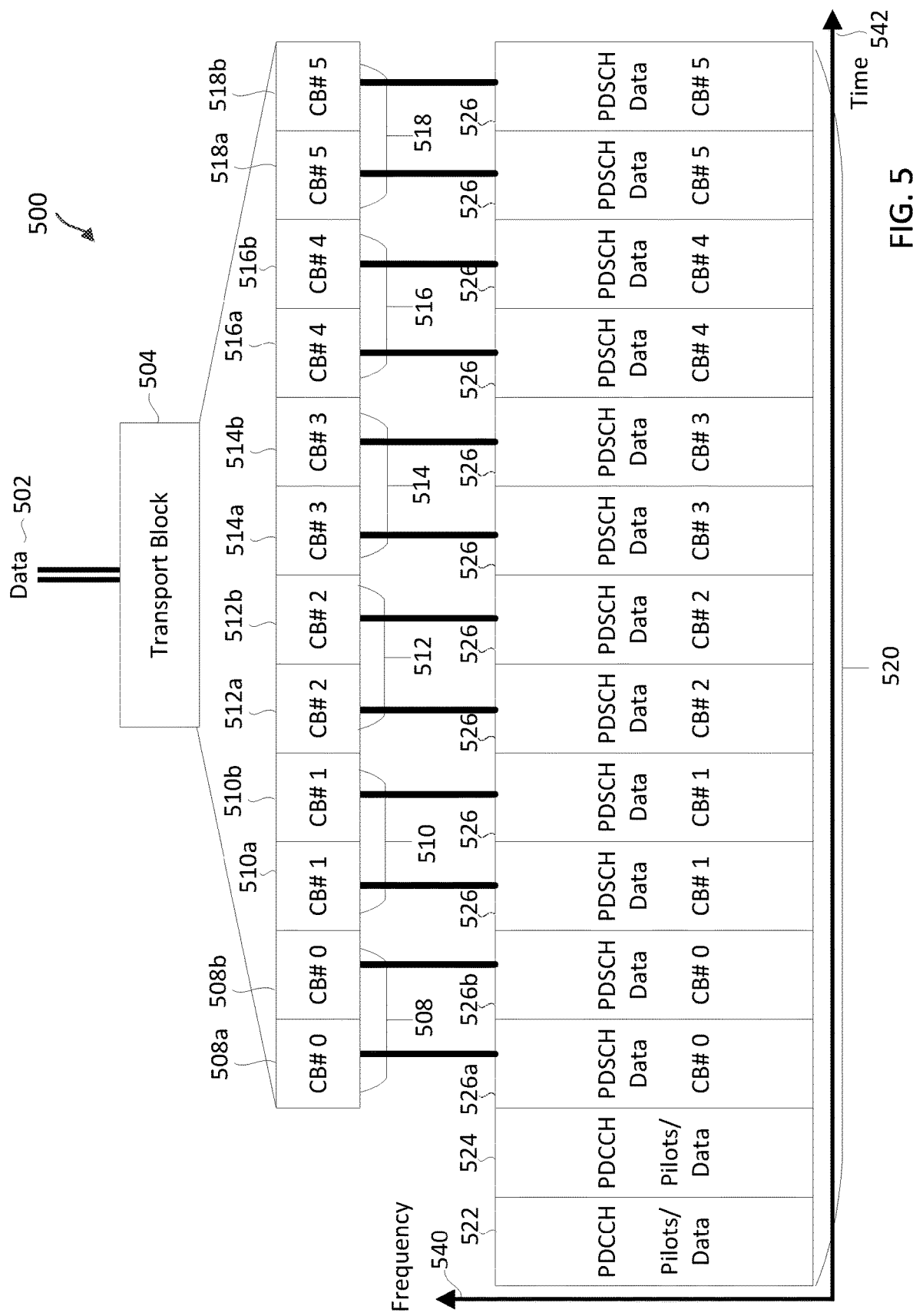
FIG. 5 illustrates an exemplary code block mapping method according to some aspects of the present disclosure.

FIG. 5 illustrates an exemplary code block mapping method 500. The vertical axis 540 represents frequency in an arbitrary unit, for example, subcarriers, and the horizontal axis 542 represents time in an arbitrary unit, for example, symbol periods. The method 500 may be performed by a wireless communication device such as a BS 105 or a UE 115 using, for example, the code block module 208 of FIG. 2. In particular, a transmitting device, which may be a BS 105 or a UE 115, may perform code block mapping during a data transmission as shown in the method 500. The method 500 may employ similar mechanisms as in the method 400 to generate code block segments described above with respect to FIG. 4. The method 500 illustrates frequency-first mapping being applied to code block mapping.

In the illustrated example of FIG. 5, data 502 is formed into a transport block 504. The data 502 may be MAC layer data. The transport block 504 is partitioned into a number of code blocks 508, 510, 512, 514, 516, 518. The code blocks 508, 510, 512, 514, 516, 518 are further partitioned into a number of code block segments 508a, 508b, 510a, 510b, 512a, 512b, 514a, 514b, 516a, 516b, 518a, 518b, for example, after encoding as described at block 406 of FIG. 4. The code block segments 508a, 508b, 510a, 510b, 512a, 512b, 514a, 514b, 516a, 516b, 518a, 518b are mapped frequency-first, without interleaving, into frequency and time resources, collectively shown as 520.

The resources 520 may include a certain time period (e.g., in units of symbols) and a certain frequency bandwidth (e.g., in units of frequency tones). In some aspects, the resources 520 may be in units of RBs. The resource 520 may span a transmission time interval (TTI), which is a smallest time unit for scheduling. The resources 520 may include a DL control portion at the beginning of the resources 520 (e.g., shown as resources 522 and 524) and a data portion (e.g. shown as resources 526). In some aspects, each of the resources 522, 524, and 526 corresponds to one OFDM symbol. The control portion of the resources 520 may be used for carrying a PDCCH signal, which may include DL control information (e.g., a scheduling grant for the data portion). The data portion of the resources 520 may be used for carrying PDSCH data (e.g., code block segments 508a, 508b, 510a, 510b, 512a, 512b, 514a, 514b, 516a, 516b, 518a, 518b).

Code block (CB) #0 segments 508a and 508b may be mapped to resources 526a and 526b. For instance, the mapping may begin at resource 526a, for example, from a lowest-frequency subcarrier to a highest-frequency subcarrier or from a highest-frequency subcarrier to a lowest-frequency subcarrier within the resource 526a. When the resources 526a is fully mapped, the mapping may begin at the next resource 526b. The mapping may continue for the remaining code block segments 510a, 510b, 512a, 512b, 514a, 514b, 516a, 516b, 518a, 518b using substantially similar mechanisms. For simplicity, code blocks are shown being partitioned into two segments, but may in practice be partitioned into any number of segments.

Method 500 can enable a reeconding receiver to perform data-aided channel estimation, but its performance may be suboptimal. Ideally, a mapping method would achieve time diversity by distributing code block segments of each code block across the timespan of the resources 520 or a TTI. Method 500, however, maps code block segments of each block (e.g., from code blocks 508-518) to a portion of time within the timespan of the resources 520.

Figure 6A:
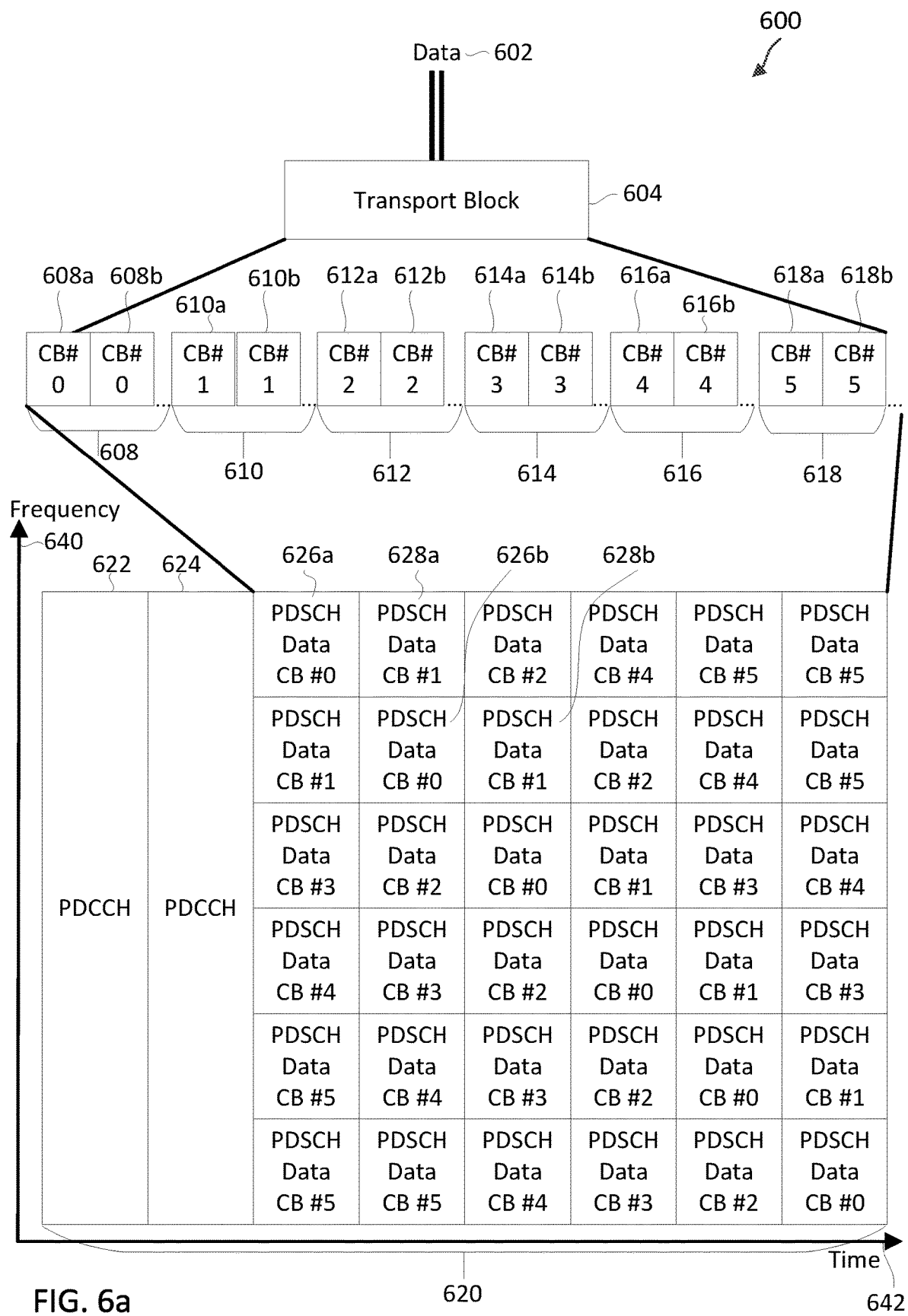
FIG. 6A illustrates an exemplary code block mapping method according to some aspects of the present disclosure.
Figure 6B:
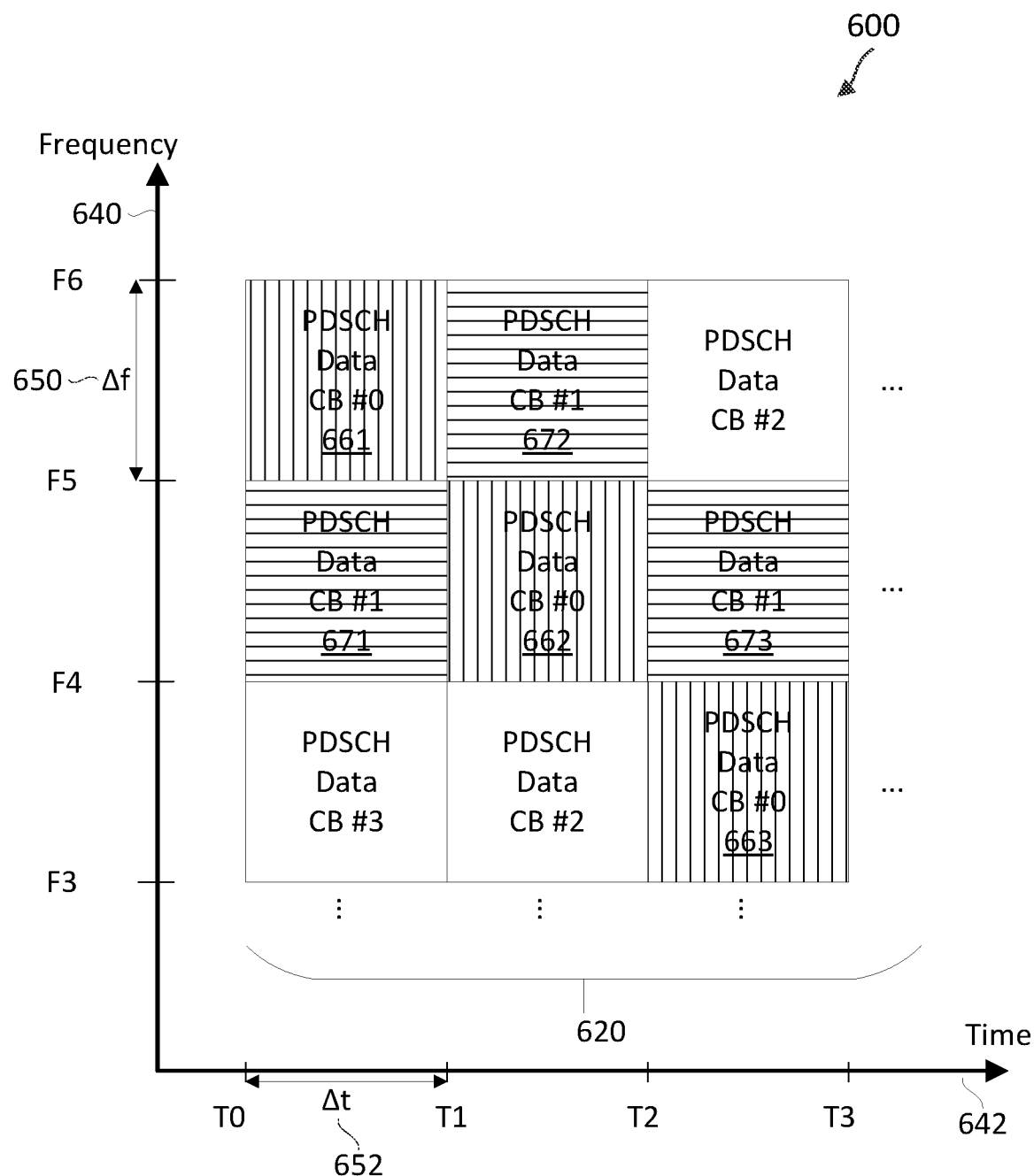
FIG. 6B illustrates an exemplary code block mapping method according to some aspects of the present disclosure.

FIG. 6A is discussed in relation to FIG. 6B to illustrate an exemplary code block mapping method 600 according to some aspects of the present disclosure. The vertical axis 640 represents frequency in an arbitrary unit, for example, subcarriers, and the horizontal axis 642 represents time in an arbitrary unit, for example, symbol periods. The method 600 may be performed by a wireless communication device such as a BS 105 or a UE 115 using, for example, the code block module 208 of FIG. 2. In particular, a transmitting device, which may be a BS 105 or a UE 115, may perform code block mapping during a data transmission as shown in the method 600. The method 600 may employ similar mechanisms as in the method 400 to generate code block segments described above with respect to FIG. 4. The method 600 illustrates code block time-frequency interleaving with a code block proximity constraint.

In the illustrated example of FIG. 6A, data 602 is packaged in a transport block 604. The transport block 604 is partitioned into a number of code blocks, 608, 610, 612, 614, 615, 616. The code blocks 608, 610, 612, 614, 615, 616 are further partitioned into a number of code block segments, 608a, 608b, 610a, 610b, 612a, 612b, 614a, 614b, 616a, 616b, 618a, 618b, for example, after encoding as described at block 406 of FIG. 4. The code block segments, 608a, 608b, 610a, 610b, 612a, 612b, 614a, 614b, 616a, 616b, 618a, 618b are mapped to time and frequency resources, collectively shown as 620. The code blocks 608, 610, 612, 614, 615, 616 are shown partitioned into two or six segments, but in practice they may be partitioned into any number of segments. Unlike in FIG. 5, the code block segments 608a, 608b, 610a, 610b, 612a, 612b, 614a, 614b, 616a, 616b, 618a, 618b are not mapped frequency-first, but are instead interleaved across time and frequency.

Code block segments 608a, 608b, 610a, 610b, 612a, 612b, 614a, 614b, 616a, 616b, 618a, 618b may be interleaved based on a code block proximity parameter and the locations of code block segments associated with different code blocks. The code block proximity parameter may constrain the placement of code block segments 608a, 608b, 610a, 610b, 612a, 612b, 614a, 614b, 616a, 616b, 618a, 618b in various ways such that code block segments of each code block may be positioned in proximity to a code block segments of a previous code block. For example, the code block proximity parameter may include time and/or frequency offsets. A time offset may indicate how many units of time, e.g., symbols, a code block segment may be placed from a different code block segment, or provide a minimum, maximum, or range of time units away from a different code block segment. Similarly, a frequency offset may indicate how far apart in a frequency band, for example, in subcarriers, a code block segment may be placed from a different code block segment, or the minimum or maximum such distance, or a range of acceptable distances. For example, if the code block proximity parameter indicates that adjacent code blocks (e.g., CB #1 610 and CB #0 608) should be near each other, then code block segments 610a and 610b, corresponding to CB #1 610, may be mapped to resources 628a and 628b, which are near resources 626a and 626b, where code block segments 608a and 608b corresponding to CB #0 608 are mapped to.

The partitioning, encoding, and mapping may be performed by a code block module 208, and the encoded code block segments may be transmitted by a transceiver 210. The encoded code block segments may be received by a transceiver 310, which may transfer the segments to a code block module 308 for decoding.

FIG. 6B presents an expanded illustration of the same exemplary code block mapping method 600 illustrated in FIG. 6A. A code block proximity offset may be defined in terms of a frequency offset 650 measured in subcarriers or other unit of frequency, and/or a time offset 652 measured in symbols or another unit of time. In some aspects, to achieve maximum time and frequency diversity in a data transmission while satisfying a code block proximity constraint, first code block segments 661-663 associated with code block 608 (shown by the vertical-stripe patterned boxes in FIG. 6B) may be placed diagonally across the allocated resource 620 and second code block segments 671-673 associated with an adjacent second code block 610 (shown by the horizontal-stripe patterned boxes in FIG. 6B) may be placed diagonally across the allocated resource 620 and offset from the first block segments 661-663. For instance, the code block segment 672 of the code block 610 is offset from the code block segment 661 of the code block 608 in time by an offset satisfying the code block proximity time offset 652. The code block segment 671 of the code block 610 is offset from the code block segment 661 of the code block 608 in frequency by an offset satisfying the code block proximity frequency offset 650. Additionally, to obtain a diagonal arrangement of code block segments 626a and 626b, the code block proximity frequency offset 650 and the code block proximity time offset 652 may be used to place code block segments of the code block 608. For instance, the code block segment 661 and 662 of the code block 608 are offset from each other by the time offset 652 and frequency offset 650

Figure 7:
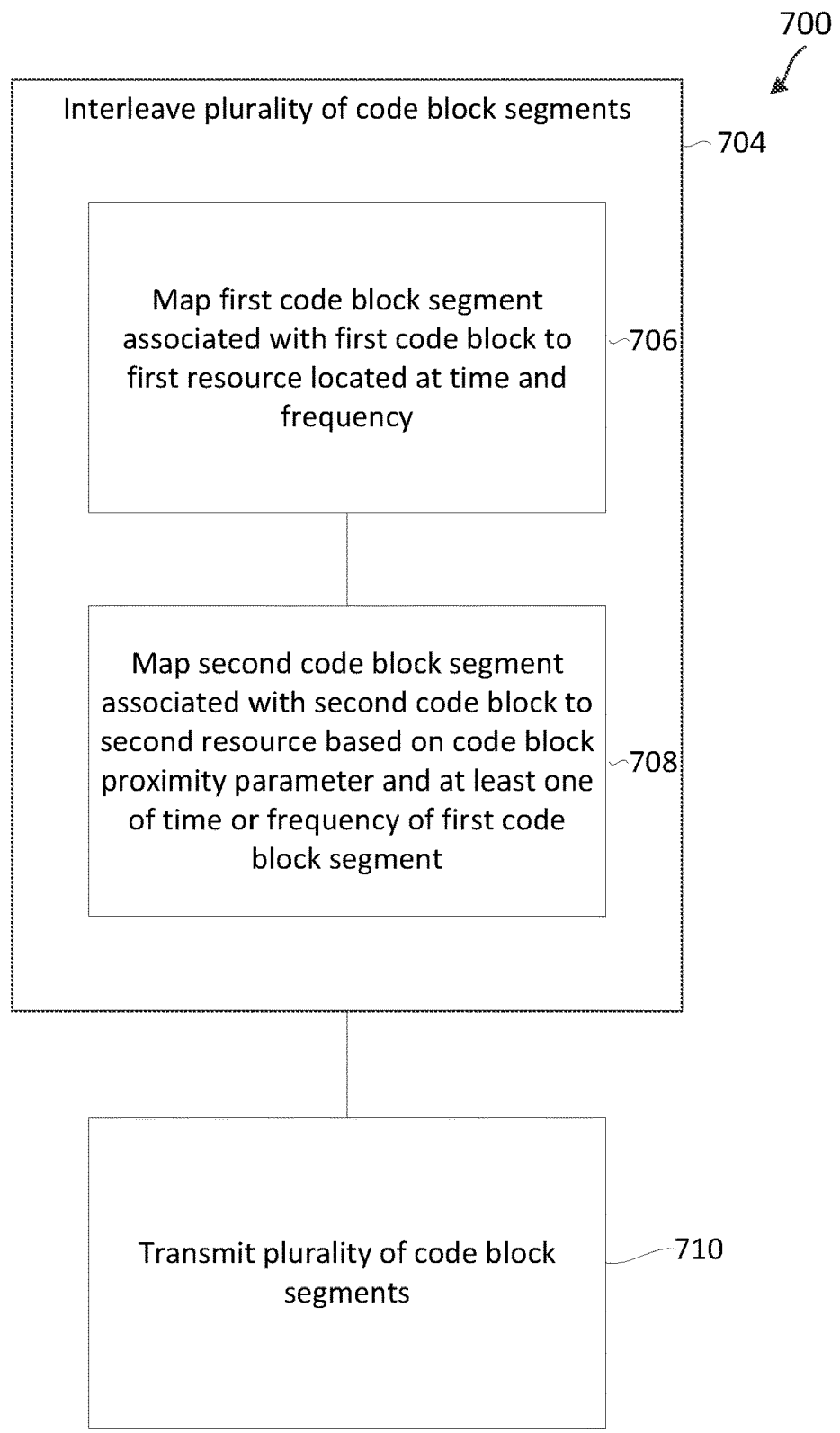
FIG. 7 is a flow diagram of a communication method according to some aspects of the present disclosure.

FIG. 7 is a flow diagram of a communication method 700 according to some aspects of the present disclosure. Aspects of the method 700 can be executed by a computing device (e.g., a processor, processing circuit, and/or other suitable component) of a wireless communication device or other suitable means for performing the steps. For example, a wireless communication device, such as the BS 105 or 200, may utilize one or more components, such as the processor 202, the memory 204, the code block module 208, the transceiver 210, the modem 212, and the one or more antennas 216, to execute the steps of method 700. The method 700 may employ similar mechanisms as in methods 500 and 600 as described above with respect to FIGS. 5 and 6. As illustrated, the method 700 includes a number of enumerated steps, but aspects of the method 700 may include additional steps before, after, and in between the enumerated steps. In some aspects, one or more of the enumerated steps may be omitted or performed in a different order.

At block 702, a first wireless communication device interleaves a plurality of code block segments. In some instances, the first wireless communication device may correspond to a BS (e.g., the BSs 105 and/or 200). In some instances, the first wireless communication device may utilize one or more components, such as the processor 202, the memory 204, the code block module 208, the transceiver 210, and the modem 212 to interleave the plurality of code block segments. The segments may have been partitioned from code blocks, themselves partitioned from a transport block as in FIG. 4. The interleaving is performed according to blocks 704 and 706.

At block 704, the device maps a first code block segment associated with a first code block to a first resource located at a time and frequency as in, for example, FIGS. 6A and 6B.

At block 706, the device maps a second block segment associated with a second code block to a second resource based on a code block proximity parameter and at least one of a time or a frequency of the first code block segment. The code block proximity parameter may constrain the placement of code block segments in various ways. For example, the code block proximity parameter may include time and/or frequency offsets. A time offset may indicate how many units of time (e.g., symbol periods) a code block segment may be placed from a different code block segment, or provide a minimum, maximum, or range of time units away from a different code block segment. In some instances, the time offset may be one symbol, or less than three symbol periods. Similarly, a frequency offset may indicate how far apart in a frequency band (e.g., in subcarriers) a code block segment may be placed from a different code block segment, or the minimum or maximum such distance, or a range of acceptable distances. In some instances, the frequency offset may be one subcarrier, or less than three subcarriers. In some instances, the first wireless communication device may utilize one or more components, such as the processor 202, the memory 204, the code block module 208, the transceiver 210, and the modem 212 to map the first and second code block segments.

At block 708, the device transmits the plurality of code block segments, using, for example, one or more of the processor 202, the memory 204, the code block module 208, the transceiver 210, or the one or more antennas 216. The transmission may include a physical downlink shared channel (PDSCH) signal including the plurality of interleaved code block segments, but not including a reference signal.

In some instances, the plurality of code block segments of block 704 is associated with a sequence of code blocks of a transport block, and the frequency and/or time offsets may indicate the distance between adjacent code blocks within the sequence of code blocks. In some instances, mapping the second code block segment associated with the second code block at block 706 is based on the second code block being adjacent to the first code block in the sequence of code blocks.

Figure 8:
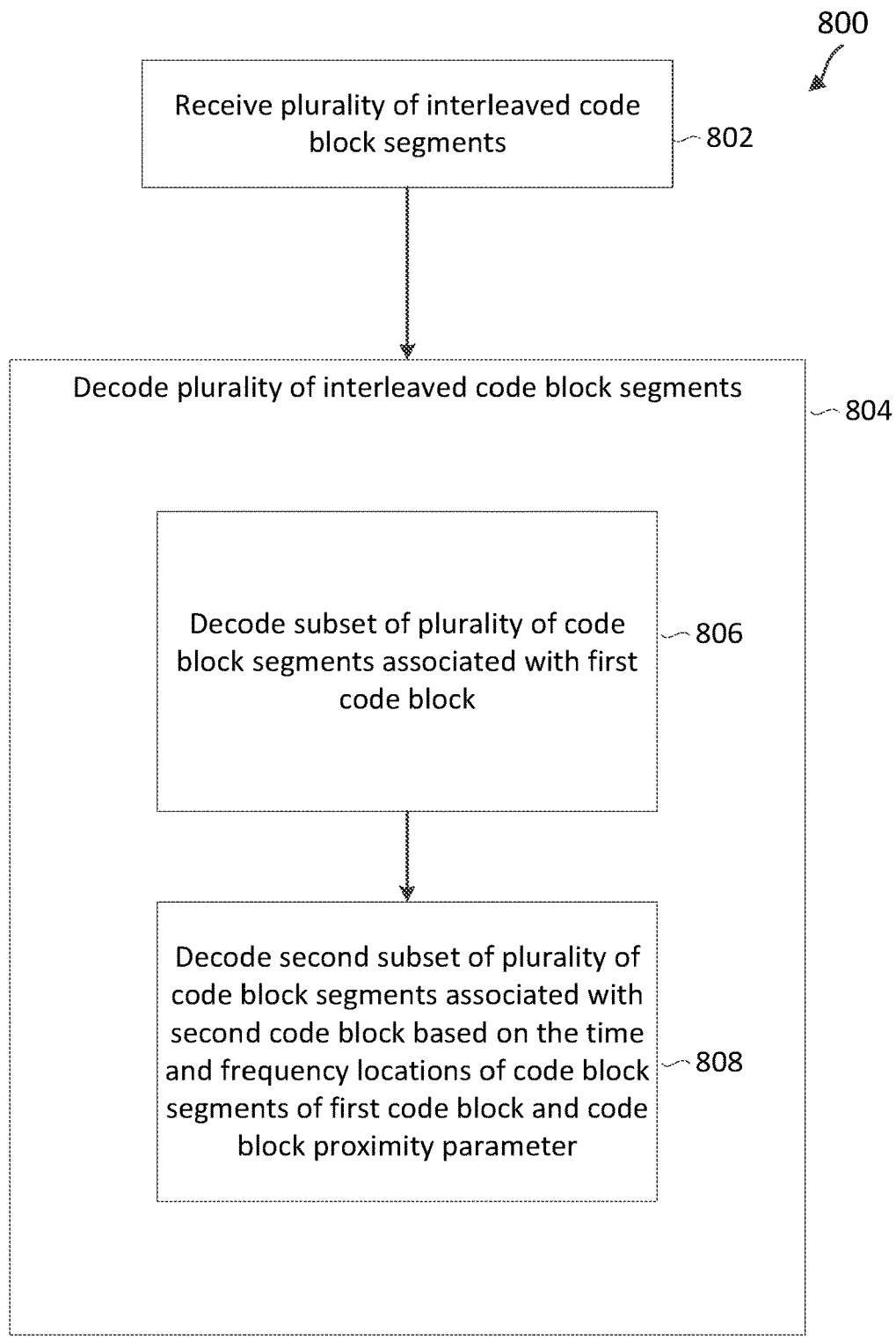
FIG. 8 is a flow diagram of a communication method according to some aspects of the present disclosure.

FIG. 8 is a flow diagram of a communication method 800 according to some aspects of the present disclosure. Aspects of the method 800 can be executed by a computing device (e.g., a processor, processing circuit, and/or other suitable component) of a wireless communication device or other suitable means for performing the steps. For example, a wireless communication device, such as the UE 115 or 300, may utilize one or more components, such as the processor 302, the memory 304, the code block module 308, the transceiver 310, the modem 312, or the one or more antennas 316, to execute the steps of method 800. The method 800 may employ similar mechanisms as in methods 500 and 600 as described above with respect to FIGS. 6 and 7. As illustrated, the method 800 includes a number of enumerated steps, but aspects of the method 800 may include additional steps before, after, and in between the enumerated steps. In some aspects, one or more of the enumerated steps may be omitted or performed in a different order.

At block 802, a first wireless communication device receives a plurality of interleaved code block segments. In some instances, the first wireless communication device may correspond to a UE (e.g., the UEs 115 and/or 300), and the device may utilize one or more components, such as the processor 302, the memory 304, the code block module 308, the transceiver 310, the modem 312, or the one or more antennas 316 to receive the plurality of interleaved code block segments.

At block 804, the device decodes the plurality of code block segments. The decoding is performed according to blocks 806 and 808. In some instances, the device may utilize one or more components, such as the processor 302, the memory 304, the code block module 308, the transceiver 310, or the modem 312 to decode the plurality of interleaved code block segments in blocks 804, 806, and 808.

At block 806, the device decodes a first subset of the plurality of code block segments associated with a first code block. Decoding the first subset of the plurality of code block segments may include decoding first data from the first subset and reencoding the first data to generate a reference signal. The reference signal may be used in decoding a second subset of the plurality of code blocks at block 808.

At block 808, the device decodes a second subset of the plurality of code block segments associated with a second code block based on the time and frequency locations of the first subset of code block segments, a code block proximity parameter, and optionally, the reference signal that may be generated at block 806. The code block proximity parameter may constrain the placement of code block segments in various ways. For example, the code block proximity parameter may include time and/or frequency offsets. A time offset may indicate how many units of time (e.g., symbol periods) a code block segment may be placed from a different code block segment, or provide a minimum, maximum, or range of time units away from a different code block segment. In some instances, the time offset may be one symbol, or less than three symbol periods. A frequency offset may indicate how far apart in a frequency band (e.g., in subcarriers) a code block segment may be placed from a different code block segment, or the minimum or maximum such distance, or a range of acceptable distances. In some instances, the frequency offset may be one subcarrier, or less than three subcarriers.

Figure 9:
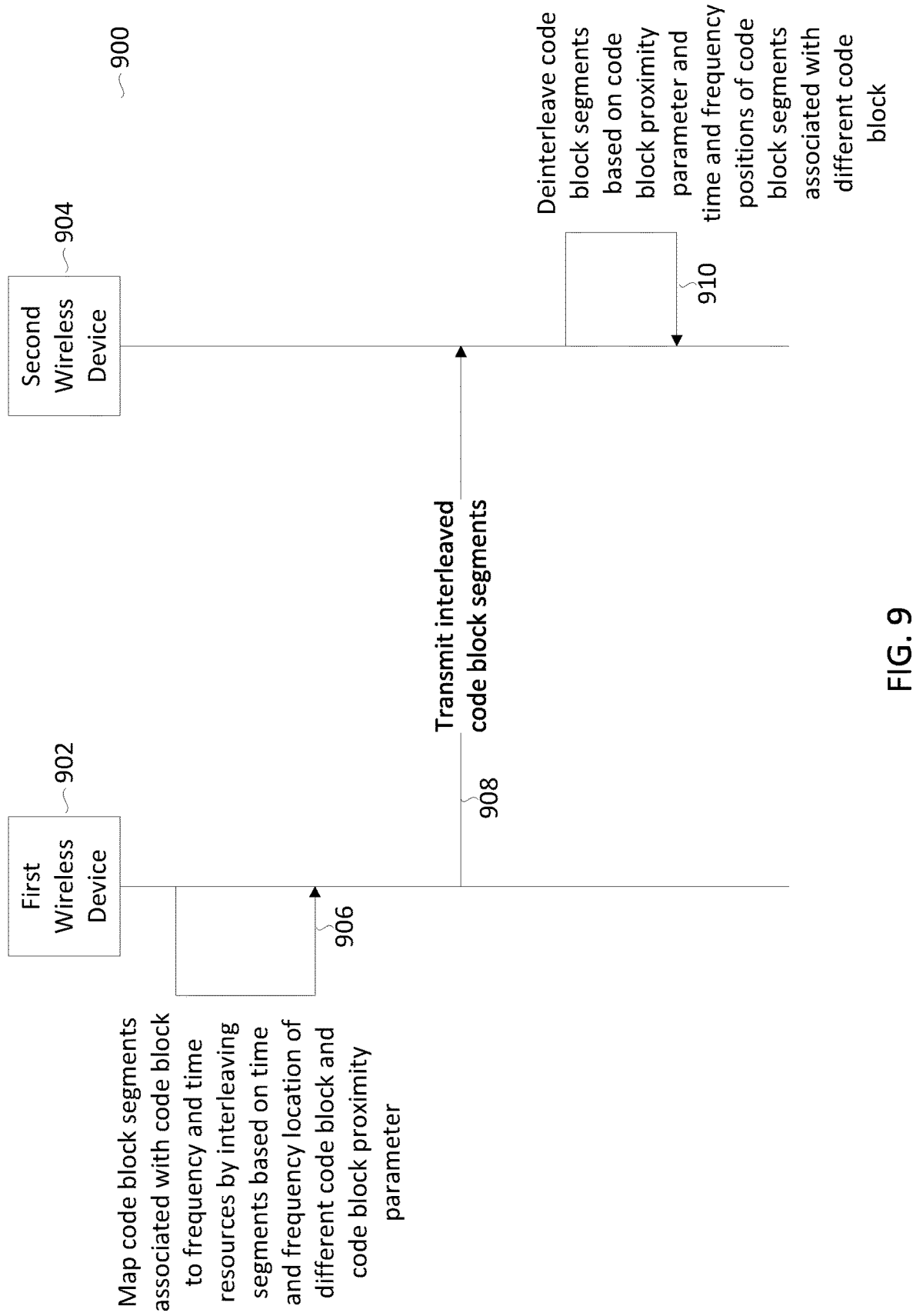
FIG. 9 is a sequence diagram illustrating a communication method according to some aspects of the present disclosure.

FIG. 9 illustrates a communication sequence 900 according to some aspects of the present disclosure. At step 906, a first wireless device 902, which may be a BS 105 or 200, or a different type of wireless device, maps a plurality of code block segments associated with a first code block to time and frequency resources by interleaving the segments based on a code block proximity parameter and the time and frequency locations of code segments associated with a different code block. At step 908, the first wireless device 902 transmits the interleaved code block segments to a second wireless device 904, which may be a UE 115 or 300, or a different type of wireless device. At step 910, the second wireless device 904 deinterleaves and/or decodes the code block segments based on a code block proximity parameter and the time and frequency locations of code block segments associated with a different code block.

In additional aspects, data aided receiver techniques are provided. Such techniques can increase system/network capacity by eliminating pilots. Pilot elimination enables using reserved pilot space to transmit data. For example, assuming one code block spans one symbol, once a certain code block has been decoded, it can be re-encoded. In re-encoded form, the re-encoded data may be used "pilots" to update channel estimation for next symbols. By leveraging re-encoding techniques, pilot transmissions may not be utilized (i.e., pilots are not needed, and those resources can be used for data transmission). In one deployment example, a code-block may span a symbol and therefore not have time diversity. Aspects enable code block interleaving in a way that each code block to have time and/or frequency diversity.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   interleaving, by a first wireless communication device, a plurality of code block segments in time and frequency by:
   mapping a first code block segment of the plurality of code block segments to a first resource located at a first time and a first frequency, wherein the first code block segment is associated with a first code block; and
   mapping a second code block segment of the plurality of code block segments to a second resource based on at least one of the first time or the first frequency of the first resource and a code block proximity parameter, wherein the second code block segment is associated with a second code block different from the first code block; and transmitting, by the first wireless communication device, the plurality of interleaved code block segments.

2. The method of claim 1, wherein the code block proximity parameter comprises at least one of a frequency offset or a time offset.

3. The method of claim 2, wherein the frequency offset is less than three subcarriers.

4. The method of claim 2, wherein the time offset is less than three symbol periods.

5. The method of claim 2, wherein the time offset is one symbol.

6. The method of claim 1, wherein the transmitting includes:

transmitting, by the first wireless communication device, a physical downlink shared channel (PDSCH) signal including the plurality of interleaved code block segments, wherein the PDSCH signal does not include a reference signal.

7. The method of claim 1, wherein the plurality of code block segments is associated with a sequence of code blocks of a transport block, and wherein the code block proximity parameter comprises at least one of a frequency offset or a time offset between adjacent code blocks within the sequence of code blocks.

8. The method of claim 7, wherein the code block proximity parameter comprises at least one of a frequency offset or a time offset between code block segments of adjacent code blocks within the sequence of code blocks.

9. The method of claim 7, wherein the mapping the second code block segment associated with second code block is further based on the second code block being adjacent to the first code block in the sequence of code blocks.

10. The method of claim 7, wherein the frequency offset is one subcarrier.

11. A method of wireless communication, comprising:

receiving, by a first wireless communication device, a plurality of code block segments interleaved in time and frequency;

decoding, by the first wireless communication device, the plurality of code block segments by:

decoding a first subset of the plurality of code block segments from first resources at a first time and a first frequency, wherein the first subset of the plurality of code block segments is associated with a first code block; and decoding a second subset of the plurality of code block segments from second resources based on the first time and the first frequency of the first resources and a code block proximity parameter, wherein the second subset of the plurality of code block segments is associated with a second code block.

12. The method of claim 11, wherein:

decoding the first subset of the plurality of code block segments comprises:

decoding, by the first wireless communication device, first data from the first subset of the plurality of code block segments associated with the first code block;

the method further comprises:

reencoding, by the first wireless communication device, the first data to generate a reference signal; and decoding the second subset of the plurality of code block segments comprises:

decoding, by the first wireless communication device, based on the reference signal, second data from the second subset of the plurality of code block segments associated with the second code block.

13. The method of claim 11, wherein the code block proximity parameter comprises at least one of a frequency offset or a time offset.

14. The method of claim 13, wherein the frequency offset is less than three subcarriers.

15. The method of claim 13, wherein the time offset is less than three symbol periods.

16. The method of claim 13, wherein the frequency offset is one subcarrier.

17. The method of claim 13, wherein the time offset is one symbol.

18. An apparatus comprising:

a processor configured to:

interleave a plurality of code block segments in time and frequency by:

mapping a first code block segment of the plurality of code block segments to a first resource located at a first time and a first frequency, wherein the first code block segment is associated with a first code block; and mapping a second code block segment of the plurality of code block segments to a second resource based on at least one of the first time or the first frequency of the first resource and a code block proximity parameter, wherein the second code block segment is associated with a second code block different from the first code block; and a transceiver configured to transmit the plurality of interleaved code block segments.

19. The apparatus of claim 18, wherein the code block proximity parameter comprises at least one of a frequency offset or a time offset.

20. The apparatus of claim 19, wherein the frequency offset is less than three subcarriers.

21. The apparatus of claim 19, wherein the time offset is less than three symbol periods.

22. The apparatus of claim 19, wherein the time offset is one symbol.

23. The apparatus of claim 18, wherein the transceiver is further configured to transmit the plurality of interleaved code block segments by:

transmitting a physical downlink shared channel (PDSCH) signal including the plurality of interleaved code block segments, wherein the PDSCH signal does not include a reference signal.

24. The apparatus of claim 18, wherein the plurality of code block segments is associated with a sequence of code blocks of a transport block, and wherein the code block proximity parameter comprises at least one of a frequency offset or a time offset between adjacent code blocks within the sequence of code blocks.

25. The apparatus of claim 18, wherein the code block proximity parameter comprises at least one of a frequency offset or a time offset between code block segments of adjacent code blocks within the sequence of code blocks.

26. The apparatus of claim 18, wherein the mapping the second code block segment of the second code block is further based on the second code block being adjacent to the first code block in the sequence of code blocks.

27. The apparatus of claim 18, wherein the frequency offset is one subcarrier.

28. An apparatus comprising:
a transceiver configured to receive a plurality of code block segments interleaved in time and frequency; and
a processor configured to decode the plurality of code block segments by:
  decoding a first subset of the plurality of code block segments from first resources at a first time and a first frequency, wherein the first subset of the plurality of code block segments is associated with a first code block; and
  decoding a second subset of the plurality of code block segments from second resources based on the first time and the first frequency of the first resources and a code block proximity parameter, wherein the second subset of the plurality of code block segments is associated with a second code block.

29. The apparatus of claim 28, wherein the processor is further configured to:
decode the first subset of the plurality of code block segments by decoding first data from the first subset of the plurality of code block segments associated with the first code block;
reencode the first data to generate a reference signal; and
decode the second subset of the plurality of code block segments by decoding, based on the reference signal, second data from the second subset of the plurality of code block segments associated with the second code block.

30. The apparatus of claim 28, wherein the code block proximity parameter comprises at least one of a frequency offset or a time offset.

* * * * *